(12) United States Patent
Boden et al.

(10) Patent No.: US 9,796,495 B2
(45) Date of Patent: Oct. 24, 2017

(54) ROBOT WITH PACKING HEAD AND INTEGRATED VACUUM ARM

(71) Applicant: Integrated Packaging Machinery, LLC, Comstock Park, MI (US)

(72) Inventors: William Boden, Howard City, MI (US); Larry Keech, Trufant, MI (US); Paul Lamb, Comstock Park, MI (US); Alex Hastings, St. Joseph, MI (US)

(73) Assignee: Integrated Packaging Machinery, LLC, Comstock Park, MI (US)

( * ) Notice: Subject to any disclaimer, the term of this patent is extended or adjusted under 35 U.S.C. 154(b) by 150 days.

(21) Appl. No.: 14/636,564

(22) Filed: Mar. 3, 2015

(65) Prior Publication Data

US 2015/0246740 A1   Sep. 3, 2015

Related U.S. Application Data

(60) Provisional application No. 61/947,139, filed on Mar. 3, 2014.

(51) Int. Cl.
| | |
|---|---|
| *B65B 21/18* | (2006.01) |
| *B65B 35/38* | (2006.01) |
| *B25J 15/06* | (2006.01) |
| *B25J 9/10* | (2006.01) |
| *B25J 15/00* | (2006.01) |

(52) U.S. Cl.
CPC ............. *B65B 35/38* (2013.01); *B25J 9/1065* (2013.01); *B25J 15/0052* (2013.01); *B25J 15/0616* (2013.01); *B65B 21/18* (2013.01)

(58) Field of Classification Search
CPC ........ B65B 21/18; B65B 35/38; B25J 9/1065; B25J 15/0052
See application file for complete search history.

(56) References Cited

U.S. PATENT DOCUMENTS

| | | |
|---|---|---|
| 1,947,609 A | 2/1934 | McNamara |
| 1,959,512 A | 5/1934 | Wall et al. |
| 1,987,336 A | 1/1935 | Powell |
| 2,867,185 A | 1/1959 | Hayward |
| 2,904,192 A | 9/1959 | Reynolds et al. |
| 2,997,242 A | 8/1961 | Grosholz |
| 3,039,623 A | 6/1962 | Sehn et al. |
| 3,406,837 A | 10/1968 | Kirsch et al. |
| 3,463,329 A | 8/1969 | Gartner |
| 3,648,853 A | 3/1972 | Winnie |
| 3,685,624 A | 8/1972 | Paddock |

(Continued)

*Primary Examiner* — Gerald McClain
*Assistant Examiner* — Ronald Jarrett
(74) *Attorney, Agent, or Firm* — Price Heneveld LLP (57) ABSTRACT

A robotic material handling apparatus comprises a packing head using vacuum to lift bottles, and a robot arm including two four-bar linkages. The four-bar linkages include a tubular structural member forming a rigid link with an internal passageway extending along the robot arm. A vacuum source is connected by hoses to the internal passageways and to the packing head as a way in integrating the vacuum lines into the robot arm. The packing head has bottle-lifting stations using vacuum to lift bottles, each including a seal shaped to sealingly engage a shoulder on the bottle. A vacuum source is connected to the seal for suctionally gripping the bottle using the shoulder to lift the bottle, regardless of whether a bottle cap is present or is missing.

6 Claims, 14 Drawing Sheets

(56) References Cited

U.S. PATENT DOCUMENTS

| | | |
|---|---|---|
| 3,753,453 A | 8/1973 | Madden et al. |
| 3,912,317 A | 10/1975 | Ohnaka |
| 3,971,190 A * | 7/1976 | McGill .................. B65B 21/18 |
| | | 414/618 |
| 4,364,707 A | 12/1982 | Ott |
| 4,451,197 A | 5/1984 | Lange |
| 4,787,812 A | 11/1988 | Göpfert |
| 4,975,016 A | 12/1990 | Pellenc et al. |
| 5,007,784 A | 4/1991 | Genov et al. |
| 5,060,455 A | 10/1991 | Schmeisser |
| 5,536,135 A | 7/1996 | Robertson |
| 5,553,442 A | 9/1996 | Fadaie |
| 5,735,200 A | 4/1998 | Tomei et al. |
| 5,797,249 A | 8/1998 | Hartness |
| 5,984,623 A | 11/1999 | Smith et al. |
| 6,592,323 B1 | 7/2003 | Hsieh |
| 7,086,941 B2 * | 8/2006 | Ennis ..................... B08B 15/00 |
| | | 454/64 |
| 7,185,685 B2 | 3/2007 | von Meyerinck |
| 7,389,826 B2 | 6/2008 | Linsmeier et al. |
| 7,474,072 B1 * | 1/2009 | Parnell .................. B25J 9/1065 |
| | | 318/568.11 |
| 7,644,558 B1 | 1/2010 | Fallas |
| 7,686,564 B2 | 3/2010 | Kaiser et al. |
| 7,856,797 B2 | 12/2010 | Black et al. |
| 7,950,708 B2 | 5/2011 | Parnell |
| 8,251,415 B2 | 8/2012 | Lomerson, Jr. |
| 8,528,955 B2 | 9/2013 | Robinson et al. |
| 2008/0246290 A1 | 10/2008 | Johansson |
| 2013/0232918 A1 | 9/2013 | Lomerson, Jr. |

* cited by examiner

ROBOT WITH PACKING HEAD AND INTEGRATED VACUUM ARM

This application claims benefit under 35 USC section 119(e) of a provisional application Ser. No. 61/947,139, filed Mar. 3, 2014, entitled ROBOT WITH PACKING HEAD AND INTEGRATED VACUUM ARM, the entire contents of which are incorporated herein by reference.

BACKGROUND OF THE INVENTION

The present invention relates to material handling devices for lifting and picking bottles, and more particularly relates to a robotic arm with novel packing head and with integrated vacuum tooling mechanism within the robotic arm.

It is known to use material handling devices for lifting and picking an array of bottles, such as for picking up and packing an array of bottles or jugs of liquid, such as 4 or 6 plastic one gallon milk jugs. Such material handling devices can also be used on glass and other containers. Many of these devices include a vacuum head for releasably gripping the bottles, and use vacuum lines attached to sides of the robotic arm to convey vacuum to the vacuum head. However, vacuum lines attached to the sides of a robotic arm tend to shift and wear on the robotic arm, leading to wearout and maintenance issues. Also, the vacuum lines are an extra component hanging on a side of the robotic arm, which tends to get in the way of maintenance for the arm, add to expense, and cause cleanliness issues.

Aside from vacuum lines, many known packing heads engage and vacuum-grip a top of the cap on the bottles being lifted and packed, such as the plastic bottle cap attached to a top of a bottle. A problem occurs when a bottle cap is missing, since existing packing heads require the cap to be present in order to generate sufficient suction to lift the bottle(s). Thus, when a cap is missing, the pick-and-place packing line shuts down until cap-missing bottle is pulled and the problem is otherwise solved. Due to a high speed of most pick-and-place packing lines, this can result in significant shut downs lasting 3-5 minutes, which at 100+ bottles per minute of many such lines, leads to considerable delay and disruption to the process.

SUMMARY OF INVENTION

In one aspect of the present invention, a material handling apparatus comprises a packing head using vacuum to lift bottles, a robot arm including at least one four-bar linkage operably supporting the packing head, one link of the four-bar linkage including a tubular elongated structural member forming an internal passageway extending along the robot arm, and a vacuum system including a vacuum source, a first hose connecting the vacuum source to a first end of the internal passageway, and at least one second hose connecting a second end of the internal passageway to the packing head.

In another aspect of the present invention, a material handling apparatus is provided for lifting containers having an opening, a cap covering the opening, and a shoulder around the opening. The apparatus comprises a packing head with at least one bottle-lifting station including a shoulder-engaging seal shaped to sealingly engage the shoulder of a bottle and having a vacuum source for drawing a vacuum inside the seal for suctionally gripping the bottle using the seal and shoulder to lift the bottle both when the cap is present and when the cap is missing.

In a narrower form, the seals each include a sidewall having a bellows-shape when viewed in a vertical cross section.

In another aspect of the present invention, a method of packing bottles having caps covering access openings into the bottles, comprises sealingly engaging an annular shoulder area around a bottle's access opening, and drawing a vacuum to suction lift the bottle with vacuum-generated forces operating on the annular shoulder area.

These and other aspects, objects, and features of the present invention will be understood and appreciated by those skilled in the art upon studying the following specification, claims, and appended drawings.

BRIEF DESCRIPTION OF THE DRAWINGS

FIGS. 4A-6A being identical to FIGS. 4-6 but with the overhead I-beams removed to expose and thus better show the four-bar linkages.

DETAILED DESCRIPTION OF PREFERRED EMBODIMENT

Figure 6:
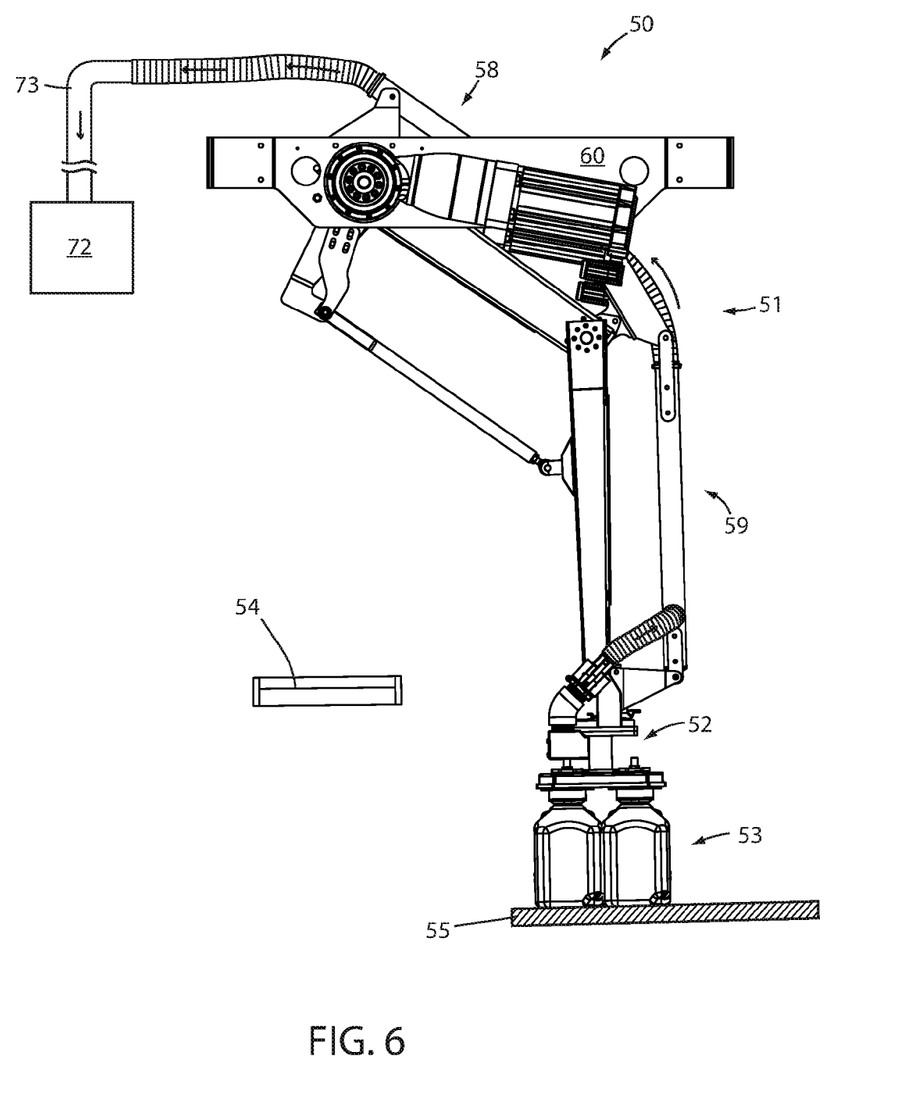
Figure 6A:
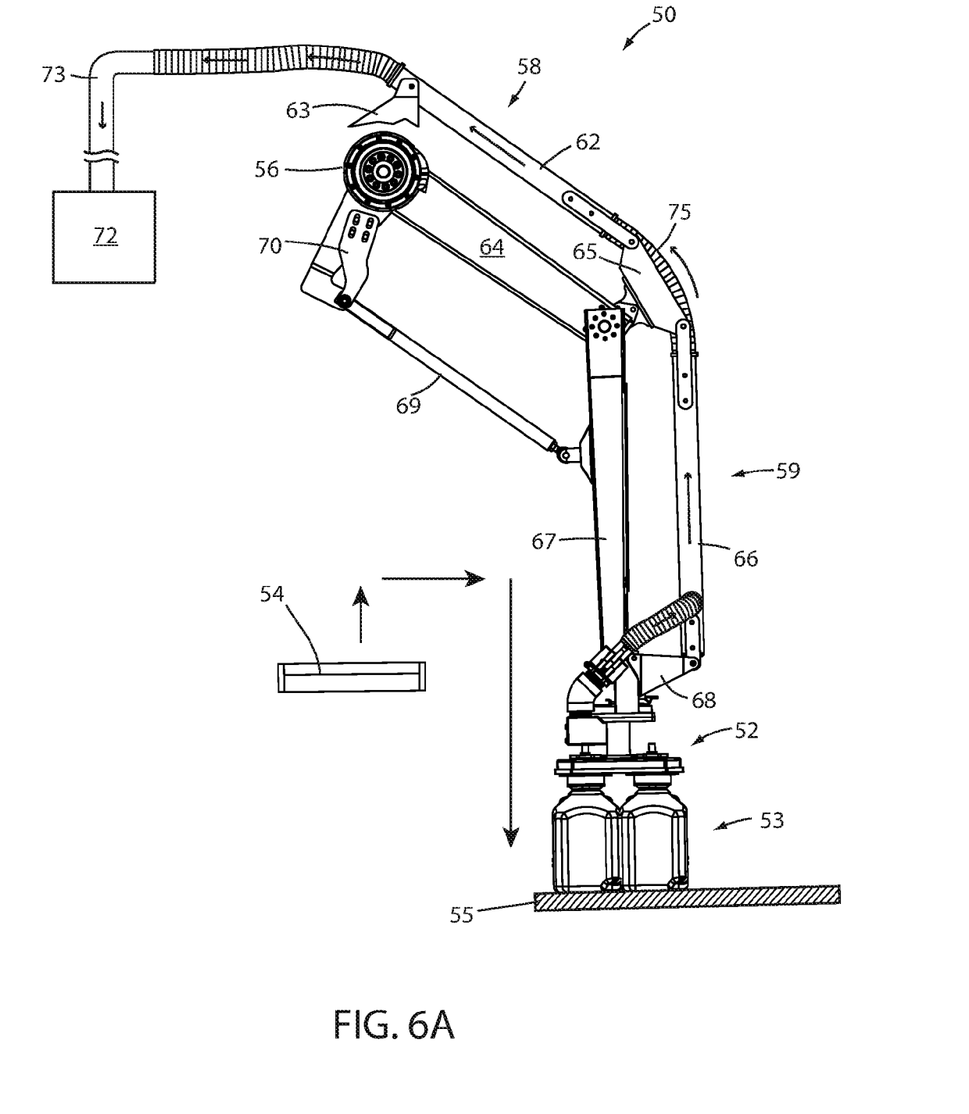

The present material handling apparatus 50 (FIG. 1) includes a robot arm 51 (FIG. 1) supporting a packing head 52 for automatically picking up an array of bottles 53 (also called "containers" herein) (such as 1 gallon milk bottles, or juice bottles, or water jugs, or the like) from a collection station 54 (FIGS. 4, 4A) and placing them into palleted containers 55 (FIGS. 6, 6A). The robot arm 51 includes electro-mechanical actuators 56 and 57 (FIG. 1) for operating first and second four-bar linkages 58 and 59 to lift, extend, and then lower the array of bottles 53 as desired. One of the structural links in each of the four-bar linkages is a hollow tube for communicating air flow (i.e. vacuum) along the robotic arm 51 to the packing head 52, thus integrating vacuum communication for the head into the robotic arm components. The fact that the tubular members double as a structural support and also as a vacuum line simplifies the assembly, eliminating several "extra" hoses and components that used to be attached to a side of the robot arm and that would wear out from rubbing against the robot arm during repeated movement of the robot arm. The resulting assembly is a much more robust and durable and integrated assembly. Also, the present packing head includes bottle-shoulder-engaging seals allowing it to lift and pack all of the one-gallon plastic milk bottles in a given array at the collection station, the even if one of the bottles is missing a bottle cap. It is contemplated that the apparatus 50 can be adapted for bottles and containers of different sizes, different materials, different shapes, and different geometric arrays/patterns.

Figure 1:
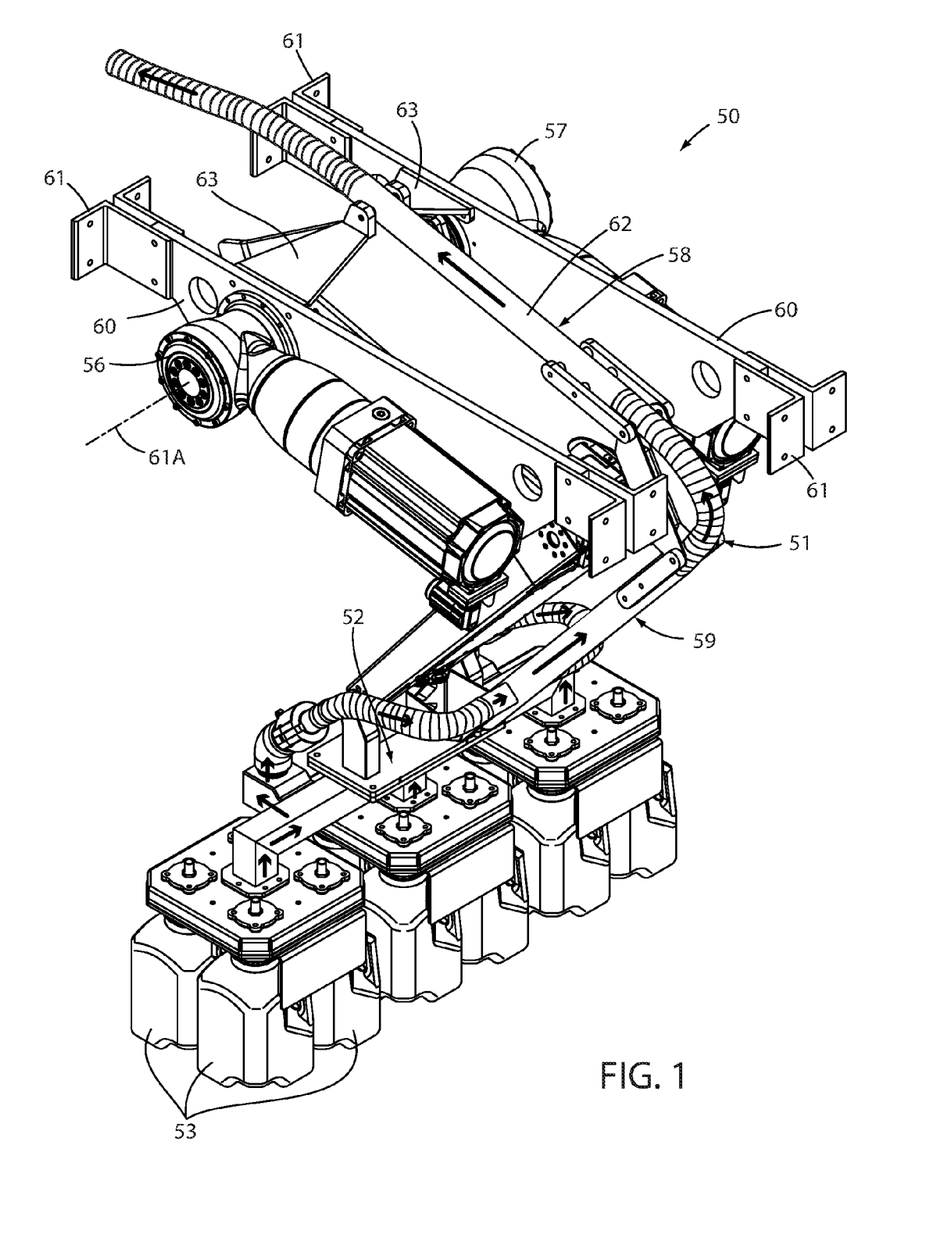
FIG. 1 is a perspective view of the present pick-and-place apparatus, including two four-bar linkages, and three multi-bottle lifting heads.
Figure 2:
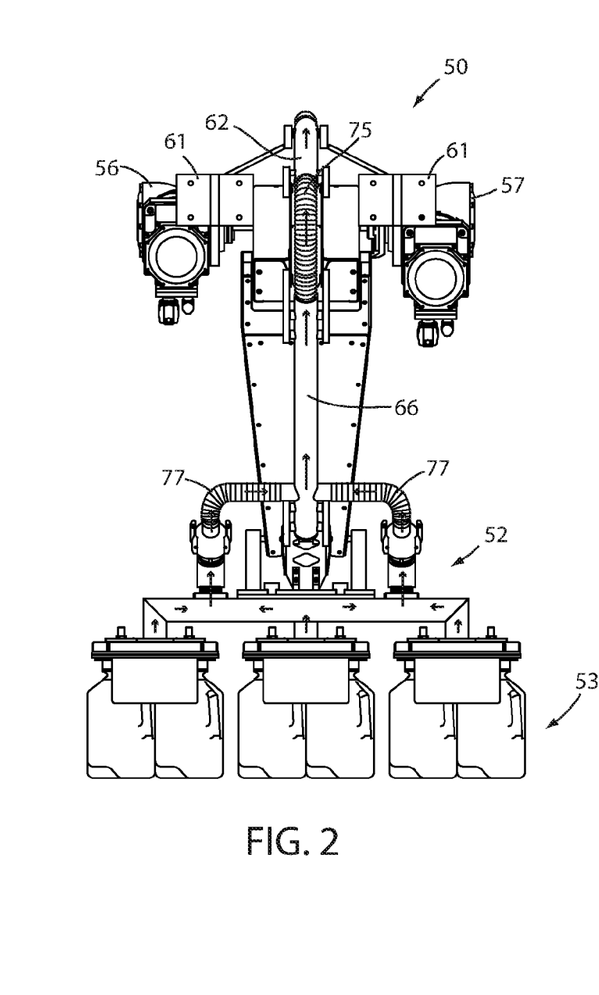
FIGS. 2-3 are side and end views of FIG. 1.
Figure 3:
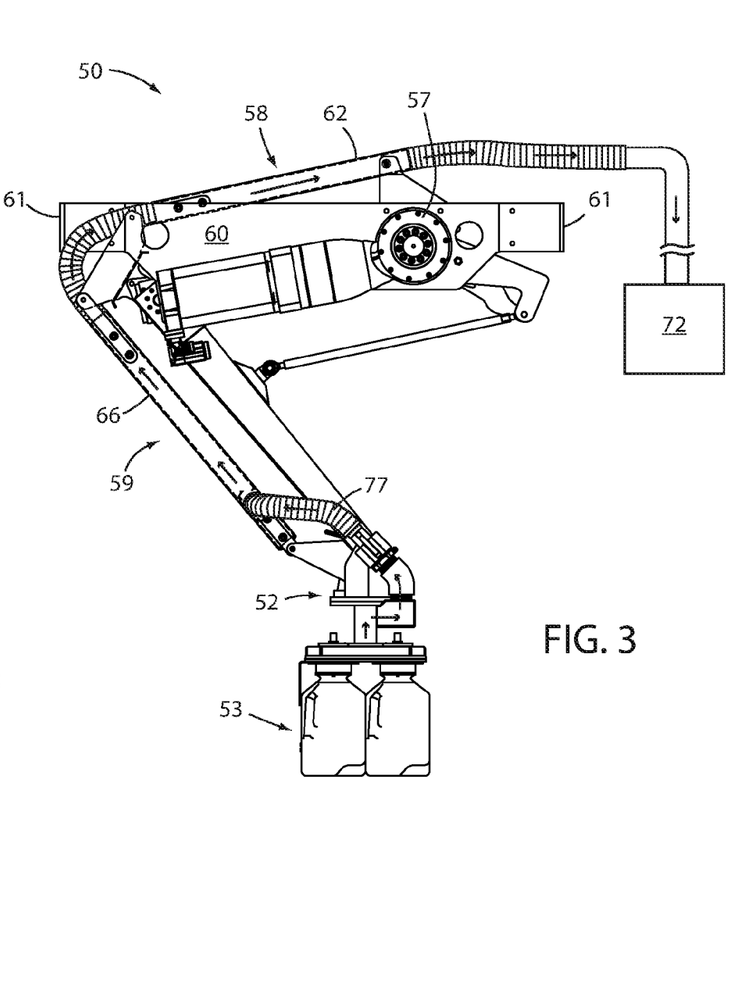
Figure 4:
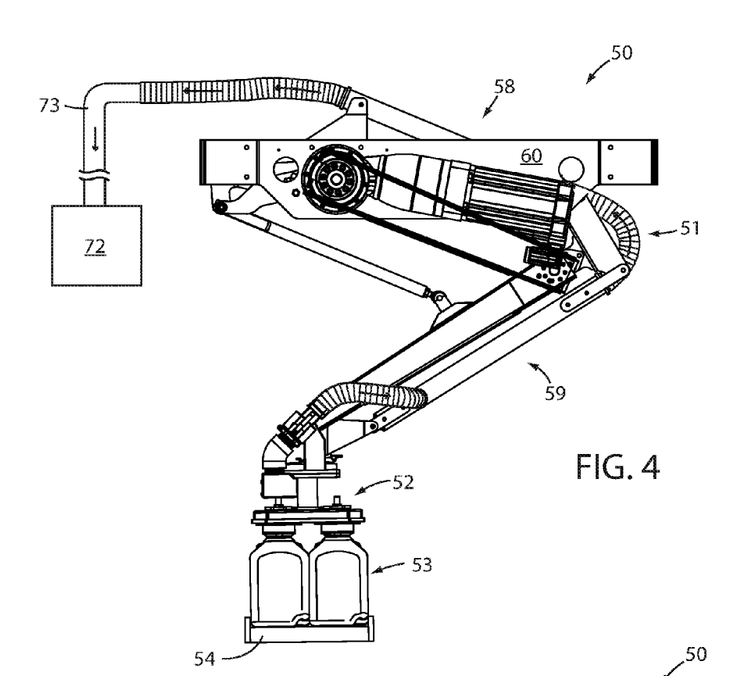
FIGS. 4-6 are side views of FIG. 1 showing the apparatus in pick, mid-move, and place positions.

The illustrated pick-and-place apparatus 50 (FIG. 1) includes two four-bar linkages 58, 59 and three multi-bottle lifting/packing heads 52 for lifting a plurality of bottles 53 (twelve bottle illustrated) in an end-of-conveyor collection station 54. The apparatus 50 includes an overhead support structure including a pair of overhead beams 60 and wall-fixing end-of-beam brackets 61. Actuators 56, 57 are mounted to the beams 60 at location identified by axis 61A. The upper four-bar linkage 58 (FIG. 4A) includes a top elongated link 62 pivoted to support brackets 63 attached between the beams 60. (The support brackets 63 form a stationary link in the four-bar linkage 58.) The four-bar linkage 58 further includes a bottom elongated link 64 connected to the actuator 56, and a T-shaped knee link 65 pivoted between links 62 and 64. The lower four-bar linkage 59 includes an outer elongated link 66 connected to knee link 65, an inner elongated link 67 connected to knee link 65, and T-shaped head-carrying end link 68 between the ends of elongated links 66 and 67. The actuator 57 is connected to the inner elongated link 67 by an actuator rod 69 extending between an actuator arm 70 of the actuator 57 and middle of the link 67. The rotation of the actuators 56 and 57 are timed so that the four-bar linkages 58 and 59 first vertically raise the packing head 52 while carrying the array of bottles 53 (compare FIGS. 4-5, and compare FIGS. 4A-5A), and then laterally move and lower the bottles 53 (compare FIGS. 5-6, and compare FIGS. 5A-6A) to deposit the bottles on pallets in a packing station. Specifically, FIGS. 4-6 are side views of FIG. 1 showing the apparatus 50 in pick, mid-move, and place positions; and FIGS. 4A-6A are identical to FIGS. 4-6 but with the overhead parallel beams removed to expose and thus better show the four-bar linkages 56, 57. The movement and timing of actuators 56 and 57 are generally known in the art such that a detailed description of their operation is not necessary for persons skilled in this art.

Four-bar linkages and pick-and-place apparatus are generally well known in the art, such that a detailed description of the present structure is not required herein for persons skilled in this art to understand the present innovation. Basically, the illustrated four-bar linkages each include 4 rigid links pivoted at four pivot points so that they move with a known path when one of the links is held stationary and another link in each linkage is moved. More specifically, the first four bar linkage includes a stationary link defined by a stationary support structure having two of the pivot points. When one of the links is moved, the opposite end of the first four bar linkage moves along a known path. The second of the four-bar linkages includes an anchoring structure mounted to the outermost link of the first four-bar linkage (i.e. at its end). An outer end of the second four-bar linkage moves along a known path when one of the links in the second four-bar linkage is moved relative to the anchoring structure. First and second actuators are connected to the first and second four-bar linkages, respectively, for moving the four bar linkages in a predetermined sequence. The lengths of the links in both four bar linkages are chosen so that a packing head mounted to an outermost link in the second four bar linkage is maintained in a horizontal "level" condition. This allows for controlled but quick movement of a packing head on the end of the second four-bar linkage, while maintaining a level orientation of the packing head.

Specifically, the illustrated upper four-bar linkage 58 includes four links defined by components 62, 63, 64, and 65 to define four pivot points. When the first actuator 56 forces bottom link 64 to rotate upward, the interaction of links 62-65 cause the top link 62 to also rotate upward (such that it remains generally parallel the bottom link 64) and cause the knee link 65 to move a known distance and rotation. When the second actuator 57 causes the inner link 67 to rotate, the interaction of links 65, 66, 67, 68 cause the outer link 66 to also rotate (such that it remains generally parallel the inner link 67). The net result is that the packing head 52 remains horizontal during the movement of the robot arm as the bottles are lifted from the collection station 54 and placed in the palleted containers 55. Restated, the packing head is moved with a quick and consistent reciprocating motion along a predetermined path while remaining level, moving from the pickup station (e.g. at an end of a bottle-filling conveyor) to the drop-off station (e.g. on a pallet). Notably, a controller controls movement of the robot arm by controlling the two actuators, thus allowing the speed and timing (and final height) of the packing head to be closely and accurately controlled.

Figure 4A:
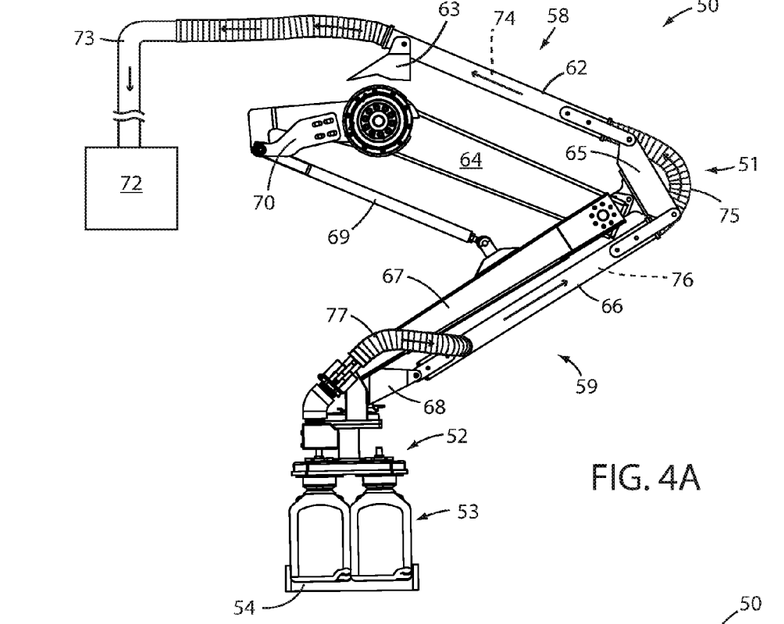
Figure 5:
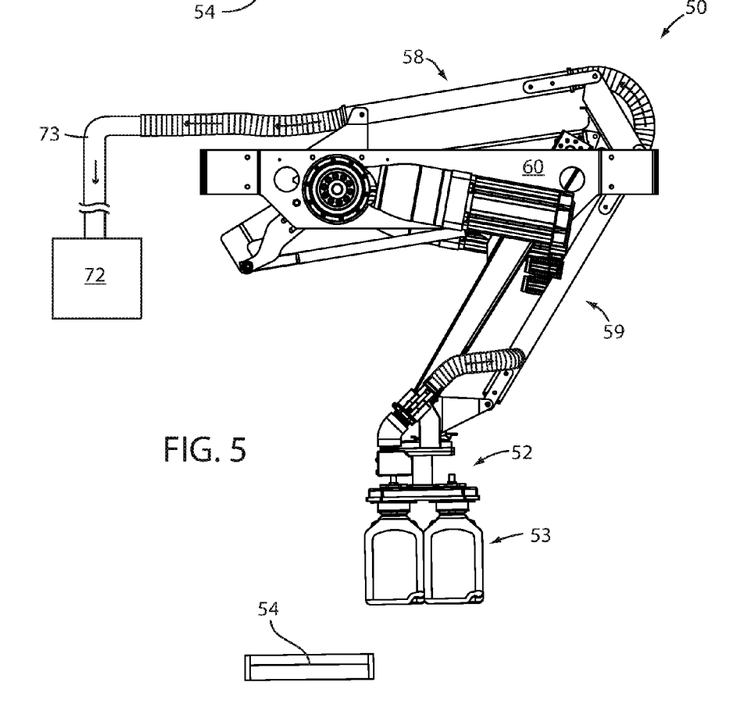
Figure 5A:
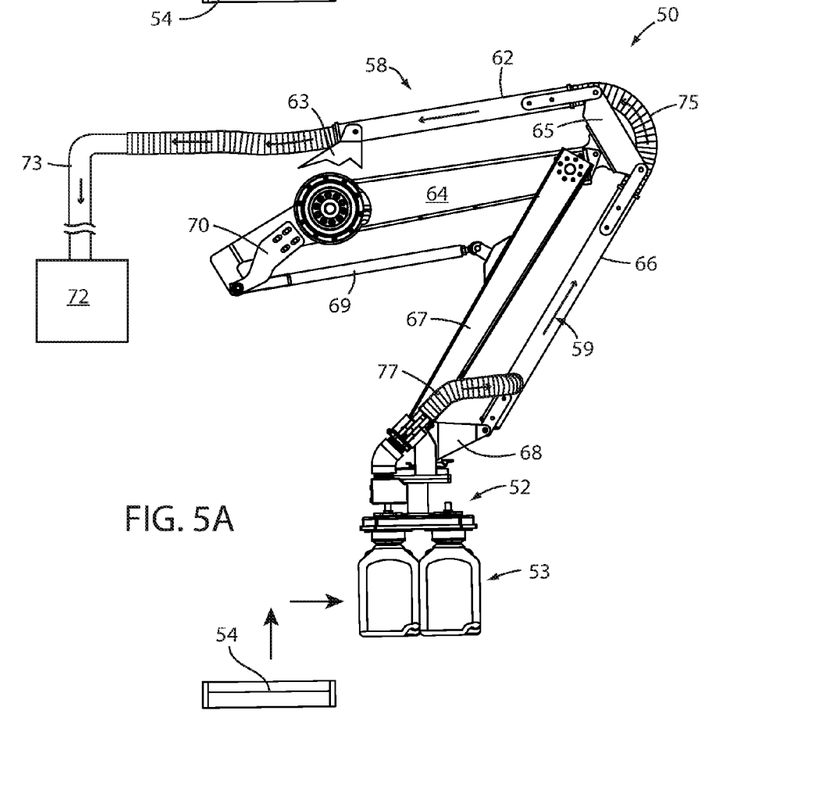

FIG. 4A illustrates the vacuum source 72 connected by hose 73 to the vacuum-conveying passageway 74 within the top link 62. The passageway 74 extends to a second hose 75 that extends across the knee link 65 to the vacuum-conveying passageway 76 within the outer link 66. A third hose 77 extends from the passageway 76 to the head vacuum manifold 78 of the packing head 52. As will be understood by persons skilled in this art and shown by comparing FIGS. 4-6 (and FIGS. 4A-6A), the hoses 73, 75, 77 undergo some flexure and movement between hose-supporting connection points during movement of the apparatus 50, but the overall movement and flexure of the hoses is minimized, and further the hoses are in partially protected out-of-the-way positions, thus leading to a much more robust and longlasting source-to-head vacuum supply system.

Figure 7:
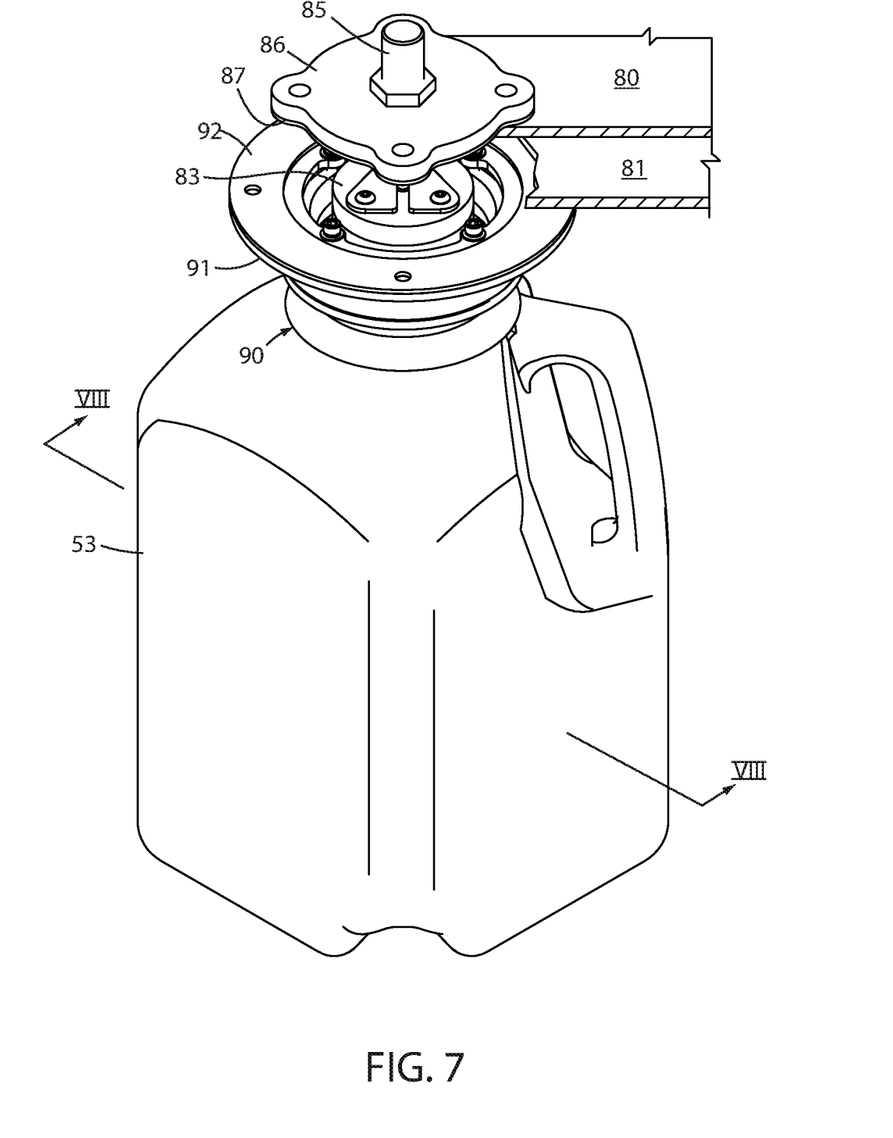
FIGS. 7-8 are perspective views of a bottle being lifted by vacuum, with a bellow-shaped seal engaging the shoulder of the bottle, FIG. 7 showing the whole bottle, FIG. 8 showing a vertical cross section through FIG. 7 to better show a position and shape of the seal.
Figure 8:
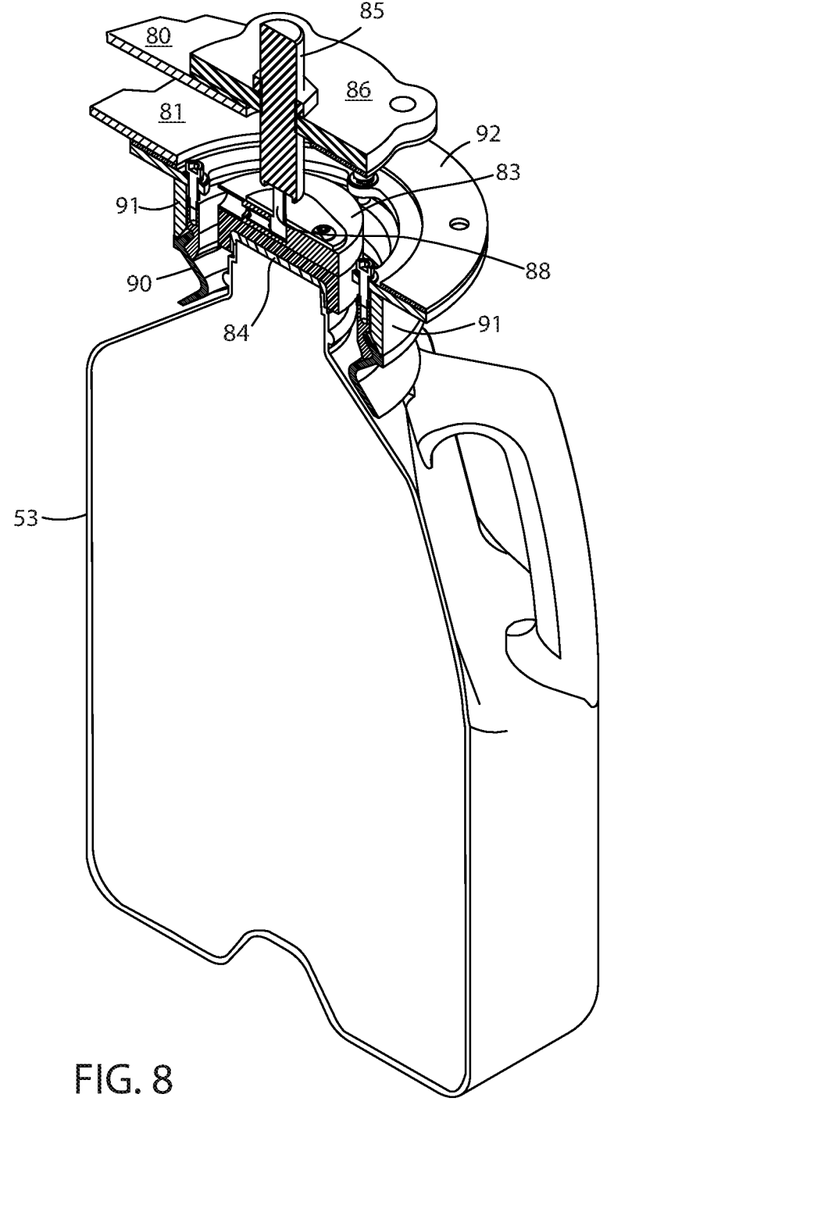
Figure 9:
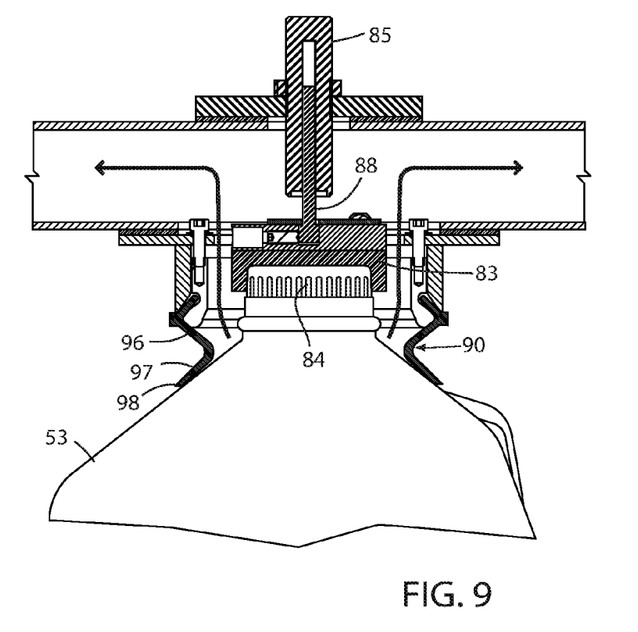
FIGS. 9-10 are side cross sectional views of FIG. 8, FIG. 9 showing a bottle cap present, FIG. 10 showing a bottle cap missing.
Figure 10:
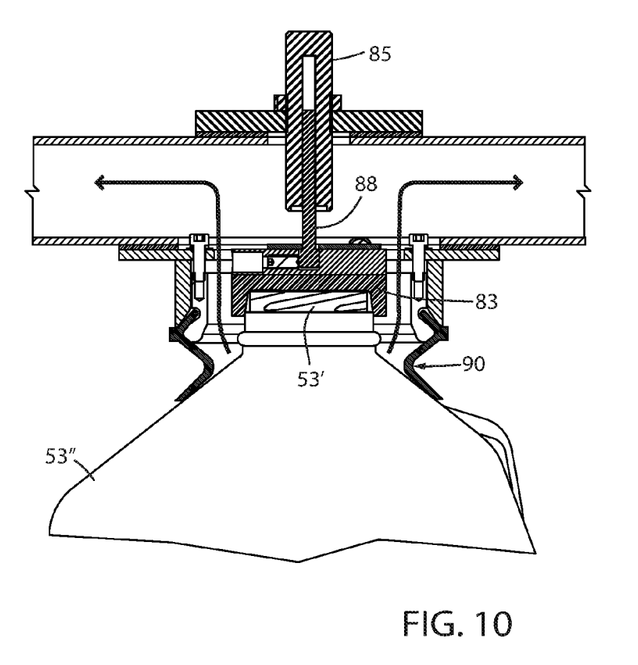

FIGS. 7-8 are perspective views of a bottle being lifted by vacuum, with a bellow-shaped seal engaging the shoulder of the bottle, FIG. 7 showing the whole bottle, FIG. 8 showing a vertical cross section through FIG. 7 to better show a position and shape of the seal and showing vacuum passages. FIGS. 9-10 are side cross sectional views of FIG. 8, FIG. 9 showing a bottle cap present, FIG. 10 showing a bottle cap missing.

Figure 11:
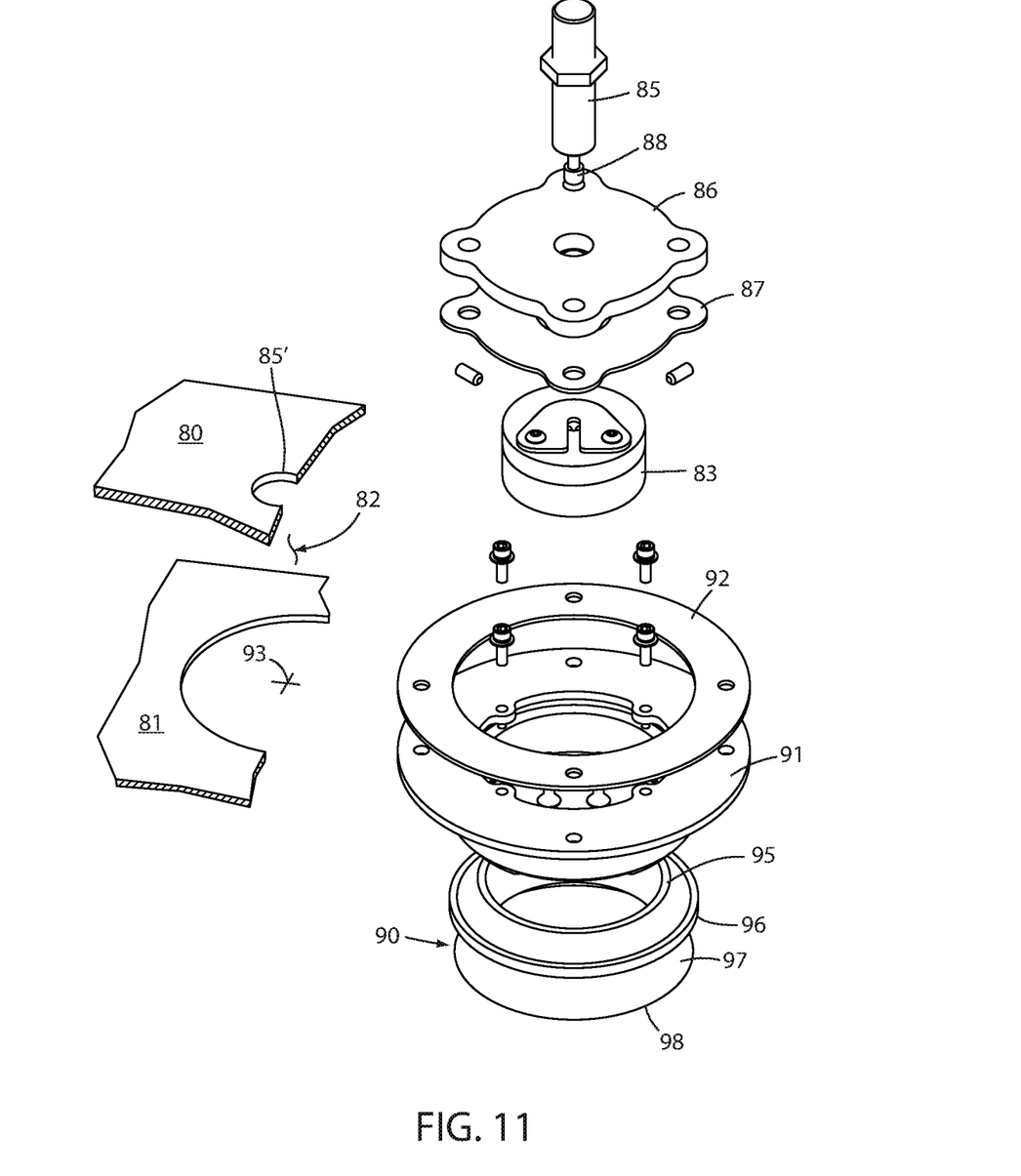
FIG. 11 is an exploded view of FIG. 7, showing the bellow-shaped seal and seal-supporting structure and showing the absorber-supported plug for engaging a top of the bottle or bottle cap.
Figure 12:
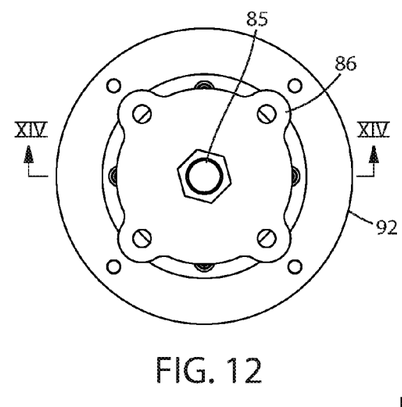
FIGS. 12-13 are top and side views of FIG. 7.
Figure 13:
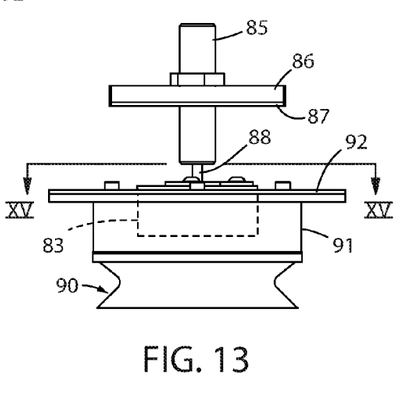
Figure 14:
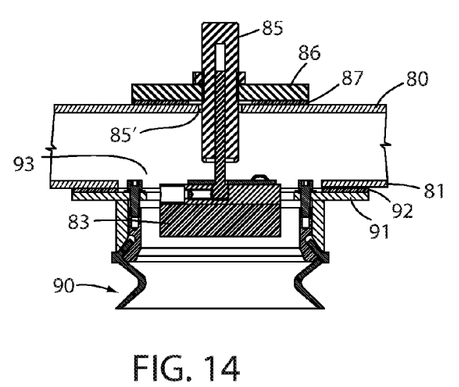
FIGS. 14-15 are cross sections taken along lines XIV-XIV and XV-XV in FIGS. 12-13.
Figure 15:
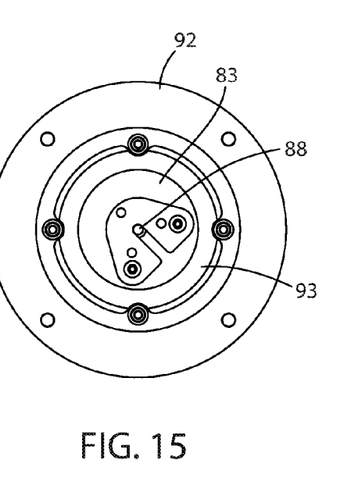

FIG. 11 is an exploded view of FIG. 7, showing the bellow-shaped seal and seal-supporting structure and showing an absorber-supported plug for engaging a top of the bottle or bottle cap. FIGS. 12-13 are top and side views of FIG. 7; and FIGS. 14-15 are cross sections taken along lines XIV-XIV and XV-XV in FIGS. 12-13.

Packing heads are well known in the art, such that a detailed description is not required for persons skilled in this art. The illustrated packing head 52 (FIG. 11) includes top and bottom plates 80 and 81 defining a cavity 82 for communicating vacuum from the hose 77 to individual bottle-lift stations on the packing head 52. A bottle-top-engaging plug 83 (also called an "adapter" herein) is located inside the seal and configured to engage the bottle cap (when present) and shaped to cover the bottle opening (when the bottle cap is missing). Specifically, the plug 83 includes a lower surface shaped to engage a top of a bottle cap 84 (FIG. 9), or if the cap is missing, engage a top 53' of the bottle 53 itself (i.e. cover the bottle opening) (FIG. 10). A shock absorber 85 (FIG. 11) extends through and is mounted in a hole 85' in the top plate 80 using a retainer 86 and flat seal 87. The shock absorber 85 includes a resiliently-supported spring-biased shaft 88 extending to and carrying the plug 83. The plug 83 can be attached to the shaft by various means, the illustrated arrangement including two set screws. The shock absorber 85 is biased downward, but permits vertical movement of the shaft 88 and plug 83. This allows the plug 83 to stably engage a bottle cap, or if the bottle cap is missing, stably/sealingly engage a top of the bottle 53. Notably, when vacuum is applied, the bellow-shaped seal 90 described below will compress against the bottle's shoulder and compress vertically as the bottle 53 is lifted a short distance by the vacuum force, with the shock absorber 85 compensating to allow that movement.

The apparatus 50 (FIG. 11) includes a novel packing head 52 with bottle-shoulder-engaging bellow-shaped seals 90. The seals 90 allow all bottles 53 in a given array at the collection station to be lifted, the even if one or more of the bottles 53 is missing a bottle cap. The bellow-shaped seal 90 is mounted using a bowl retainer 91 and flat ring seal 92 attached by screws to the bottom plate 81 around a hole 93 in the bottom plate 81. The hole 93 is larger than the plug 83 so that air (i.e. vacuum) can flow from inside the bellow-shaped seal 90 up through the hole 93 into the vacuum-conveying cavity 82 of the packing head 52. The bellow-shaped seal 90 includes an upper mounting ring portion 95 for sealingly engaging the bowl retainer 91, and further includes downwardly-extending resilient ring portions 96, 97 defining a bellow-shaped structure. The ring portions 96, 97 are bellow-shaped and resilient, and their lower edge 98 is thinned and extends radially outward. The lower edge 98 is shaped to flex and abuttingly sealingly engage the shoulder 53" that extends around the threaded cap-engaging neck of the bottle 53. The illustrated lower edge 98 forms a relatively uniform circular shape slightly larger than the bottle cap 84, and engages a shoulder on the bottle located generally around the bottle's neck that defines the bottle's opening (and which is normally covered by a bottle cap).

Figure 16:
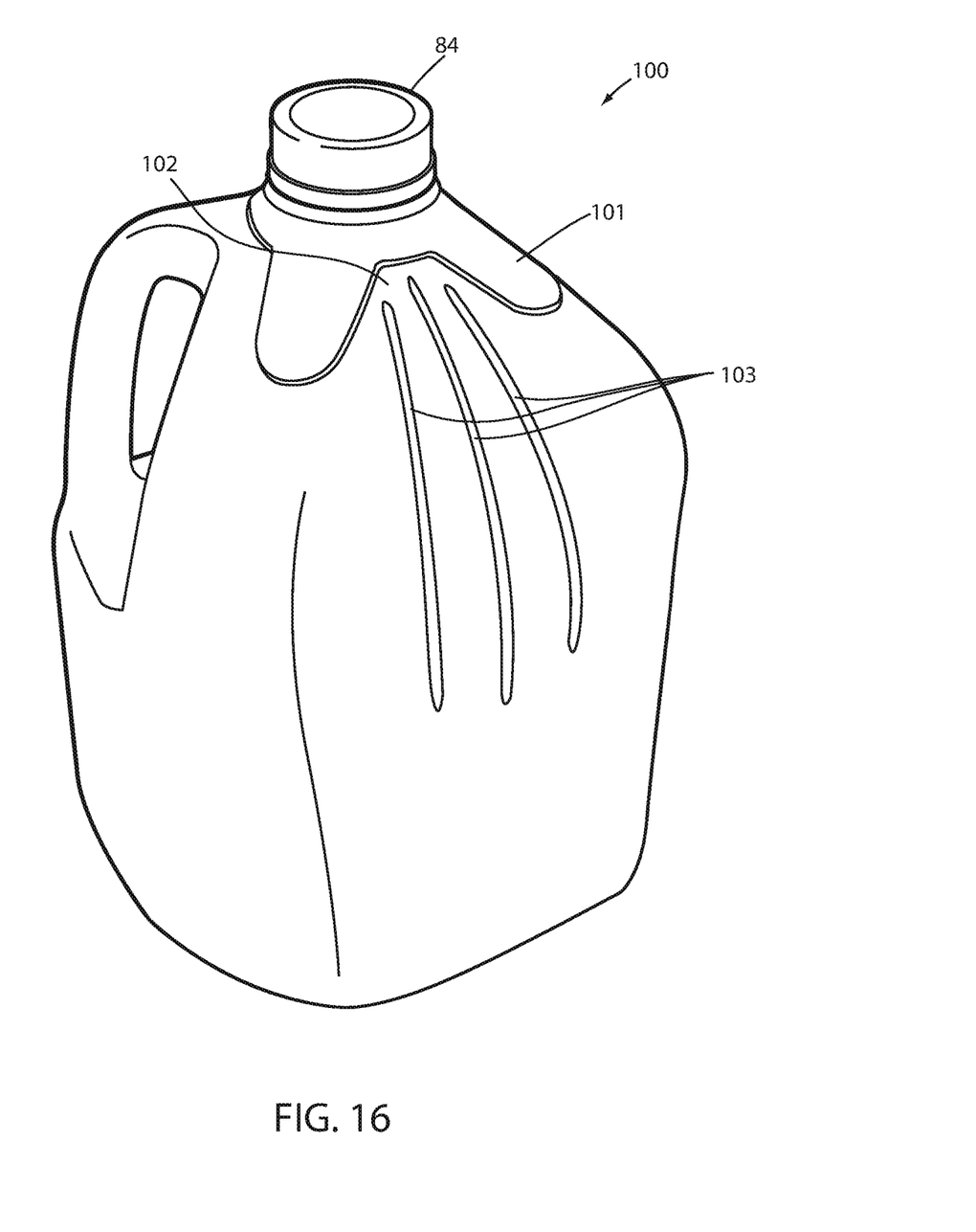
FIG. 16 is a new container with modified shoulder having indentations and ribs.
Figure 17:
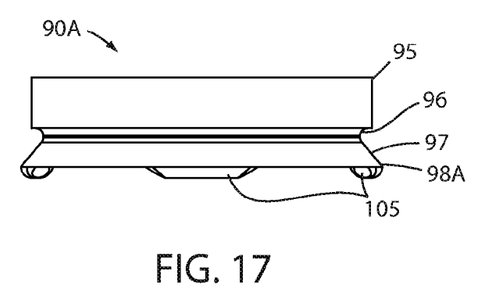
FIGS. 17-19 are side, top, and bottom perspective views of a modified bellow-shaped seal for engaging the modified shoulder of the bottle of FIG. 16.
Figure 18:
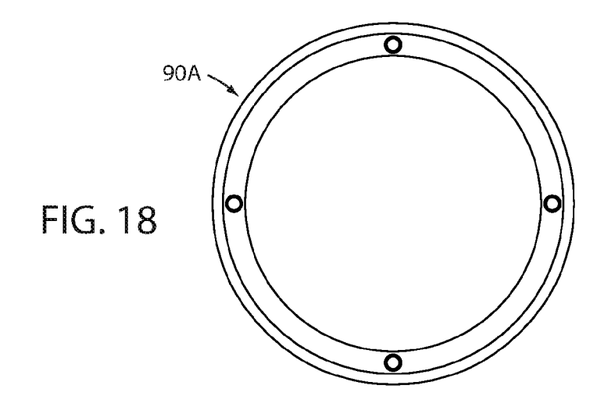
Figure 19:
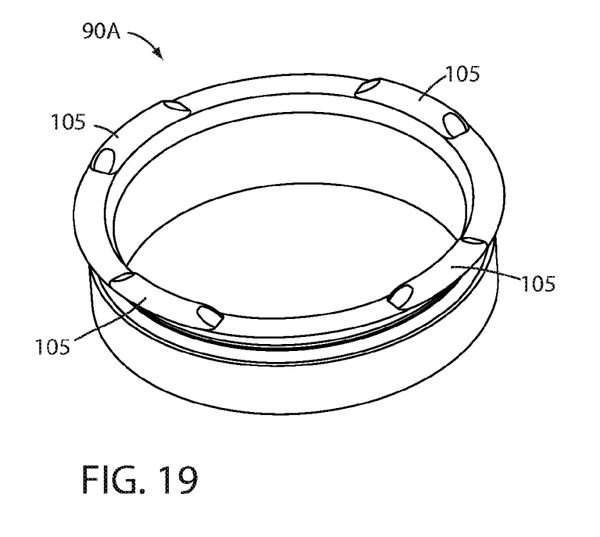
Figure 20:
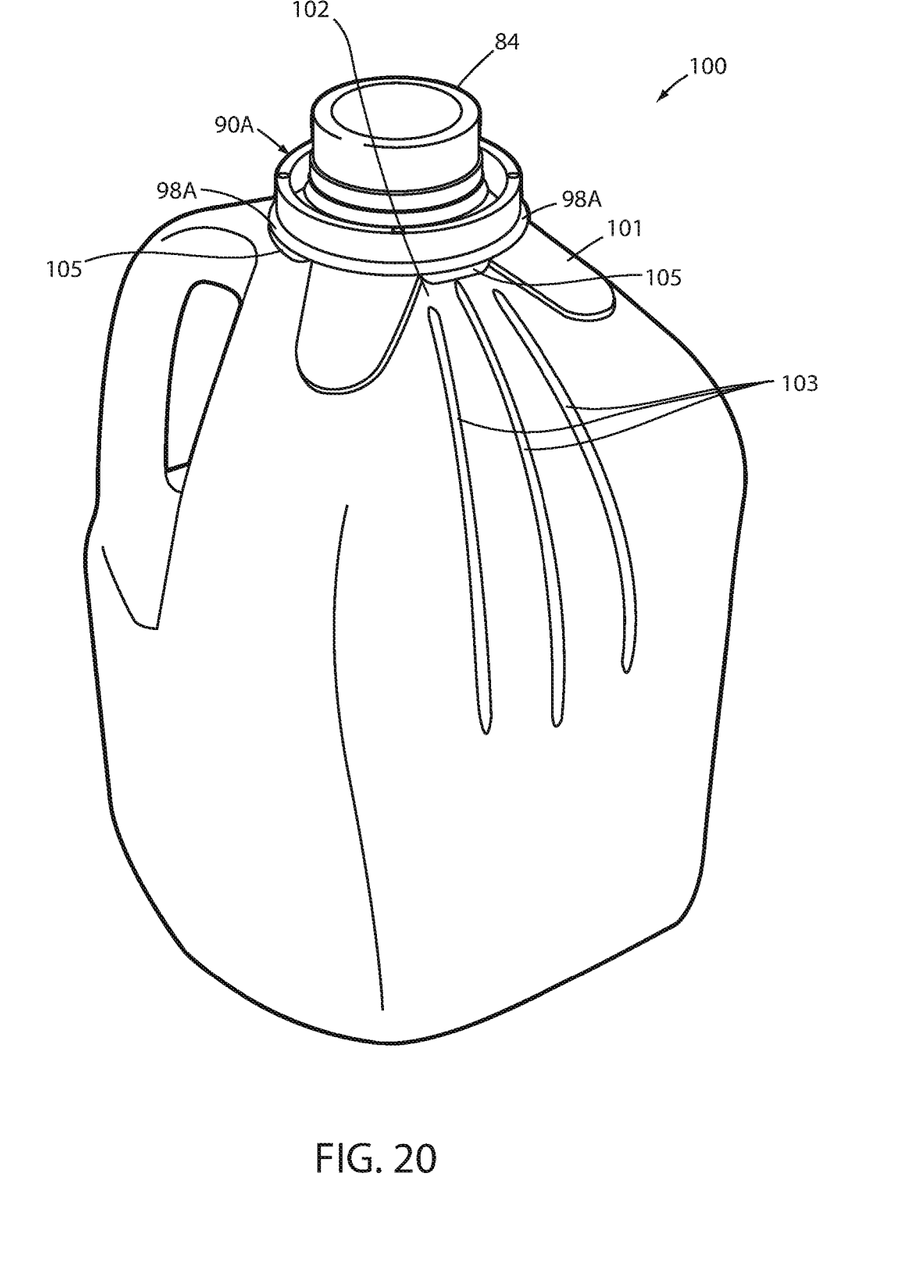
FIG. 20 is a cross section showing the modified seal of FIG. 17 engaging the modified bottle's shoulder of FIG. 16.

Recently, some bottle-filling companies have begun using a new container 100 (FIG. 16) with a modified shoulder 101 that does not include a uniformly smooth and circular shoulder like shoulder 54". Instead, the modified shoulder 101 has indentations and undulations forming recesses and ribs in the shoulder. The illustrated modified shoulder 101 includes indentations forming inverted U-shaped recesses 102 that intrude into the shoulder area, and further includes multiple ribs 103 (three ribs being illustrated) with upper ends that intrude into the shoulder area. The bellow-shaped seal 90A (FIGS. 17-19) is identical to seal 90 but is modified to include bumps 105 on the lower edge 98A. The bumps 105 extend circumferentially short distances, and are located to correspond to and fill the U-shaped recesses 102. Specifically, the bumps 105 have a length sufficient to fill the recesses 102, and a width sufficient to not interferingly engage the end of any ribs 103. Thus, abuttingly engage the shoulder 101 and allow a vacuum to be drawn inside the seal 90A despite the existence of the recesses 102 and ribs 103 in the bottle 100.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A material handling apparatus for packing bottles, comprising:
    a packing head using vacuum to lift bottles;
    a robot arm including at least one actuator operably connected to a first and a second four-bar linkages with the first four-bar linkage operably supporting the second four-bar linkage for movement and the second four-bar linkage operably supporting the package head for movement between a bottle-collection station and a bottle-palleted station, one link of each of the first and second four-bar linkages being a tubular elongated structural member forming a vacuum-conveying internal passageway extending along the robot arm, another link of the first four-bar linkage being formed by stationary support brackets, and two additional links of the first four-bar linkage supporting the one link for movement relative to the support brackets; and
    a vacuum system including a vacuum source, a first hose connecting the vacuum source to a first end of the vacuum-conveying internal passageway in the first four-bar linkage, and a second hose connecting a second end of the vacuum-conveying internal passageway of the first linkage to a first end of the vacuum-conveying internal passageway of the second linkage, and a third hose connecting a second end of the vacuum-conveying internal passageway of the second linkage to the packing head, to thus form a vacuum-conveying continuous passageway that extends from the vacuum source through the first, second, and third hoses and through the vacuum-conveying internal passageways of the first and second four-bar linkages to the packing head.

2. A material handling apparatus adapted to lift bottles each having a bottle top defining an opening normally closed by a bottle cap and a bottle shoulder around the opening, comprising:
    a packing head with at least one bottle-lifting station including bottle-engaging members each having a shoulder-engaging seal and a plug inside the seal defining a continuously-open vacuum-drawing space for drawing a vacuum on an associated one of the bottle tops between the seal and plug, the plug being shaped to directly contact the bottle cap when present on the associated one of the bottles and also shaped to sealingly cover an associated one of the openings when a bottle cap is missing on the associated one of the bottles while in both circumstances permitting vacuum to be drawn between the plug seal; and
    a vacuum source connected to the vacuum-drawing space of each of the bottle-engaging members for drawing a vacuum inside the seal for suctionally gripping the bottles using the seal and shoulder to lift the bottles both when the cap is present and when the cap is missing.

3. The apparatus of claim 2, wherein the at least one bottle-lifting station includes a plurality of bottle-lifting stations.

4. The apparatus of claim 2, wherein the seal includes a bellow-shaped section constructed to foldingly collapse.

5. The apparatus of claim 2, including a bottle-opening-covering adapter inside the seal having a downwardly concave shape configured to matingly engage a top and sides of the bottle cap and that is also shaped to engage a top surface of the bottle when the bottle cap is missing.

6. A material handling apparatus adapted to lift bottles each having a bottle top defining an opening normally closed by a bottle cap and a bottle shoulder around the opening, comprising:
- a packing head with at least one bottle-lifting station including bottle-engaging members each having a shoulder-engaging seal and a plug inside the seal defining a vacuum-drawing space for drawing a vacuum on an associated one of the bottle tops between the seal and plug, the plug being shaped to directly contact the bottle cap when present on the associated one of the bottles and also shaped to sealingly cover an associated one of the openings when a bottle cap is missing on the associated one of the bottles while in both circumstances permitting vacuum to be drawn between the plug and seal;
- the bottle-engaging members further including a spring-biased shock absorber movably supporting the plug for sealing engagement when the bottle cap is present and when the bottle cap is not present; and
- a vacuum source connected to the vacuum-drawing space of each of the bottle-engaging members for drawing a vacuum inside the seal for suctionally gripping the bottles using the seal and shoulder to lift the bottles both when the associated cap is present and when the associated cap is missing.

* * * * *